United States Patent
George et al.

(10) Patent No.: US 12,381,407 B2
(45) Date of Patent: Aug. 5, 2025

(54) DIAGNOSTICS FOR ELECTRIC VEHICLE CHARGING

(71) Applicant: International Truck Intellectual Property Company, LLC, Lisle, IL (US)

(72) Inventors: Eric Lee George, Fort Wayne, IN (US); Mark Stephan Ehlers, Fort Wayne, IN (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 0 days.

(21) Appl. No.: 18/230,773

(22) Filed: Aug. 7, 2023

(65) Prior Publication Data

US 2025/0055292 A1   Feb. 13, 2025

(51) Int. Cl.
*H02J 7/00* (2006.01)
*B60L 53/66* (2019.01)

(52) U.S. Cl.
CPC ............. *H02J 7/0042* (2013.01); *B60L 53/66* (2019.02)

(58) Field of Classification Search
None
See application file for complete search history.

(56) References Cited

U.S. PATENT DOCUMENTS

| | | |
|---|---|---|
| 4,739,184 A | 4/1988 | Onesti |
| 5,365,436 A | 11/1994 | Schaller et al. |
| 6,272,402 B1 | 8/2001 | Kelwaski |
| 7,397,349 B2 | 7/2008 | Lahr et al. |
| 7,421,323 B2 | 9/2008 | Dannenberg et al. |
| 7,429,804 B2 | 9/2008 | Lengacher et al. |
| 8,169,104 B2 | 5/2012 | Cunningham et al. |
| 8,207,633 B2 | 6/2012 | Oleksiewicz |
| 2010/0181827 A1 | 7/2010 | Cunningham et al. |
| 2011/0012423 A1 | 1/2011 | Gollmer et al. |
| 2011/0018339 A1 | 1/2011 | Oriet et al. |
| 2011/0210605 A1 | 9/2011 | Duan et al. |
| 2012/0286568 A1 | 11/2012 | Duan et al. |
| 2013/0009465 A1 | 1/2013 | Bajjuri et al. |
| 2013/0054085 A1 | 2/2013 | Casey |

(Continued)

OTHER PUBLICATIONS

User Manual for PCE-EVSE 300 Electrical Vehicle Tester, PCE Instruments, published Nov. 4, 2021 (13 pages).

(Continued)

*Primary Examiner* — Jared Fureman
*Assistant Examiner* — Aqeel H Bukhari
(74) *Attorney, Agent, or Firm* — Umang Khanna

(57) ABSTRACT

A diagnostic apparatus for electric vehicle charging is provided. In some aspects, the diagnostic apparatus includes an input connector unit comprising a plurality of inputs that receive electrical signals from a charging station for electric vehicle charging, and an output connector unit comprising a plurality of outputs that send electrical signals to an electric vehicle. The diagnostic apparatus also includes a circuit network electrically connecting corresponding inputs of the plurality of inputs to outputs of the plurality of outputs, and a housing at least partially enclosing the circuit network. The diagnostic apparatus further includes at least one circuit access that exposes at least a portion of the circuit network.

15 Claims, 9 Drawing Sheets

(56) References Cited

U.S. PATENT DOCUMENTS

| | | |
|---|---|---|
| 2015/0015063 A1 | 1/2015 | Bissontz |
| 2015/0217640 A1 | 8/2015 | Bissontz |
| 2018/0195506 A1* | 7/2018 | Söderström ......... F04B 43/0072 |
| 2022/0080850 A1* | 3/2022 | Reynolds .............. H02J 7/0049 |
| 2023/0347775 A1* | 11/2023 | List ........................ B60L 53/66 |
| 2024/0042874 A1* | 2/2024 | Pollica .................. B60L 53/122 |

OTHER PUBLICATIONS

SAE J1772, Wikipedia, https://en.wikipedia.org/wiki/SAE_J1772, published Apr. 22, 2009, accessed Jul. 31, 2023 (4 pages).

* cited by examiner

DIAGNOSTICS FOR ELECTRIC VEHICLE CHARGING

FIELD

The present disclosure generally relates to electric vehicles (EVs) and equipment. More particularly, embodiments described herein relate to a diagnostic apparatus for EV and equipment charging.

BACKGROUND

Some EVs, like cars, trucks, and buses, may be charged using charging cables that include certain security features to ensure proper operation. For instance, some charging cables may include low voltage communication circuitry that allows a charge station and an EV to "talk" before, during, and after a charging event. Despite safety and other equipment features, issues sometimes arise during a charging event between the charging station and EV, such as communication errors, hardware errors, charging errors, and so forth. To resolve such issues, a repair technician may need diagnose communication circuitry, as well as other components or circuits involved in EV charging. For instance, in some situations, the repair technician may need to locate and access communication circuitry inside the charging station, EV, or both, and then "tap" into or connect to the communication circuitry to obtain diagnostic data. However, locating and accessing communication circuitry may not be possible, efficient, or safe for certain charging events or issues. For instance, in some charging scenarios, a charging station may output large currents or voltages that pose a significant risk to the repair technician. Also, charging stations may be locked and accessible only by certain personnel, which may not include the repair technician. Further, charging and communication circuits in an EV may also be difficult to access. Alternatively, the repair technician may rely on proprietary reporting from various hardware to inform on vehicle charging status. Yet proprietary reporting may not always be available, accessible, functional, or provide information sufficient to diagnose an issue being investigated.

Therefore, there is a need for improved technologies to diagnose issues associated with EV, and other rechargeable equipment, charging.

SUMMARY

A diagnostic apparatus for electric vehicle charging is provided.

In one embodiment, the diagnostic apparatus includes an input connector unit comprising a plurality of inputs that receive electrical signals from a charging station for electric vehicle charging, and an output connector unit comprising a plurality of outputs that send electrical signals to an electric vehicle. The diagnostic apparatus also includes a circuit network electrically connecting corresponding inputs of the plurality of inputs to outputs of the plurality of outputs, and a housing at least partially enclosing the circuit network. The diagnostic apparatus further includes at least one circuit access that exposes at least a portion of the circuit network.

In another embodiment, the diagnostic apparatus includes an input connector unit comprising a plurality of inputs that receive electrical signals from a charging station for electric vehicle charging, and an output connector unit comprising a plurality of outputs that send electrical signals to an electric vehicle. The diagnostic apparatus also includes a circuit network electrically connecting corresponding inputs of the plurality of inputs to outputs of the plurality of outputs, at least one testing port electrically connected to the circuit network that transmits electrical signals received from the charging station to diagnostic equipment coupled to the at least one testing port. The diagnostic apparatus further includes a housing at least partially enclosing the circuit network, and at least one circuit access that exposes at least a portion of the circuit network.

DETAILED DESCRIPTION

Figure 1:
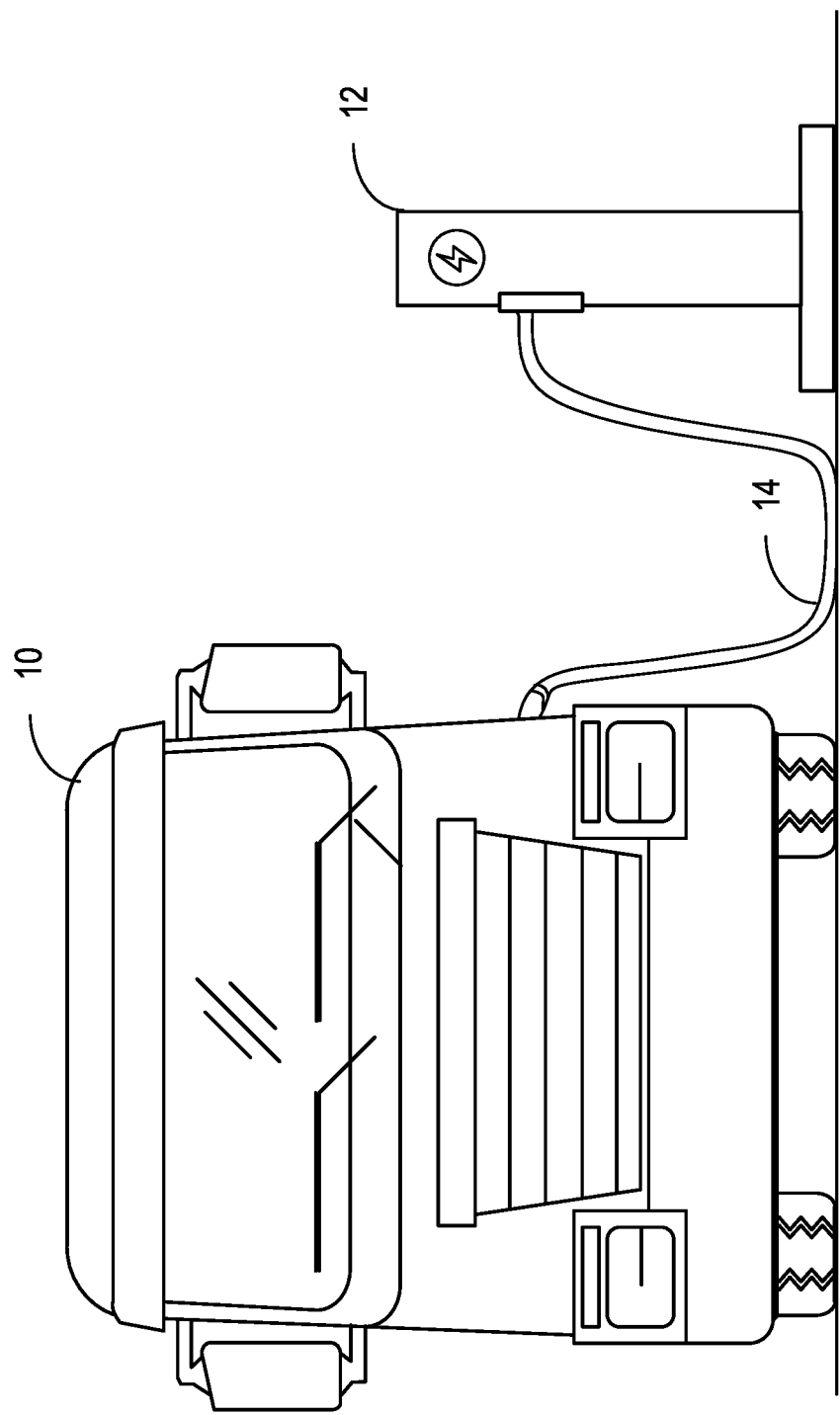
FIG. 1 is a diagram showing an example electric vehicle (EV) connected to a charging station, as described herein.

FIG. 1 illustrates an example electric vehicle (EV) 10 connected to a charging station 12 via a charging cable 14. When operating correctly, the charging station 12 provides electric charge to the EV 10 so that the EV 10 can reach its destination or extend its driving range. However, errors or charging inefficiencies may occur while charging the EV 10. Under the configuration shown in FIG. 1, it may be difficult or impossible to diagnose such errors or inefficiencies without disconnecting the charging cable 14 from the EV 10, and/or accessing internal hardware of the EV 10, charging station 12, or both. Such diagnostic approaches may not allow detection of certain issues or measurement of certain parameters, such as real-time measurement of current flow and voltage in the charging cable 14 while charging. Also, accessing hardware under charging conditions can present risks to a technician. Although FIG. 1 shows a certain type of EV 10, aforementioned drawbacks are applicable to charging various types of electric hardware, equipment, and vehicles, such as automobiles, buses, trucks, trailer tractors, utility vehicles, sport utility vehicles (SUVs), recreational vehicles (RVs), construction vehicles, agricultural vehicles, highway vehicles, and the like, as well as various types of boats, planes, drones, trains, motorbikes, and so forth.

The present disclosure solves several problems of conventional approaches by providing a diagnostic apparatus for use in EV 10 charging. In some embodiments, the diagnostic apparatus may act as an "extension" connectable to an EV 10, a charging station 12, or both, that can provide direct access to particular charging cable 14 wiring, such as power or communication wiring in the charging cable 14. A technician may attach diagnostic equipment (e.g., oscilloscope, analyzer, other diagnostic tools) to the diagnostic apparatus to diagnose any issues in electric charging. Further, conventional charging cable design make it difficult, if not impossible, to directly measure amperage or profiles of current flow because powered and grounded wiring in charging cables 14 is commonly sheathed together, which render current measurement tools, like inductive current clamps, not useful. By contrast, in some embodiments, the diagnostic apparatus provided herein allows for inductive measurement while current is flowing. Further, although the diagnostic apparatus, in various embodiments, may be described herein with respect to EV charging, the diagnostic apparatus may have broad applicability to any rechargeable equipment, including, but not limited to, marine equipment, construction equipment, robotic equipment, agricultural equipment, and so forth.

Figure 2:
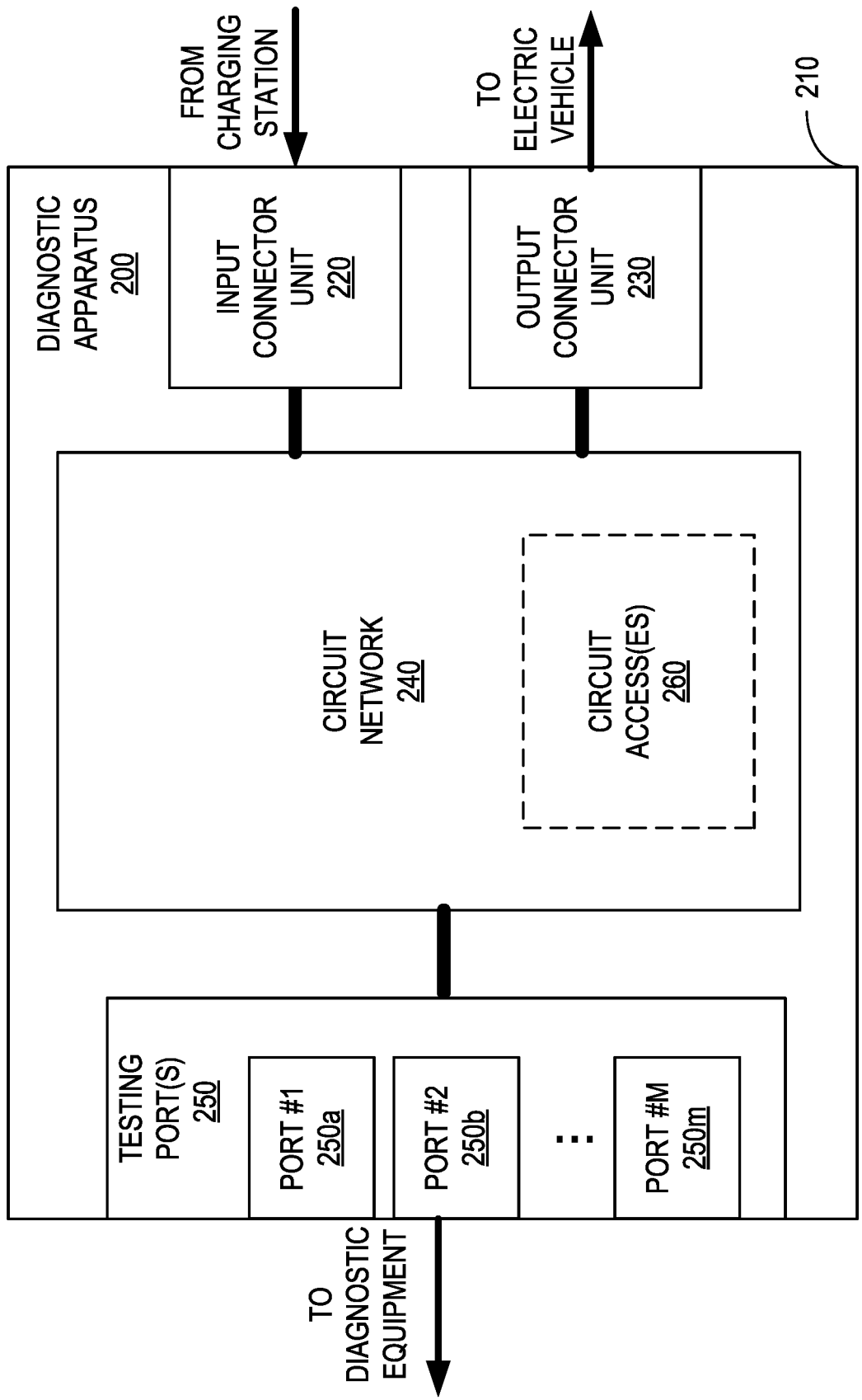
FIG. 2 is a schematic diagram of a diagnostic apparatus, as described herein.

Turning to FIG. 2, a diagnostic apparatus 200 is illustrated, in accordance with aspects of the present disclosure. In some embodiments, the diagnostic apparatus 200 may include a housing 210, an input connector unit 220, an output connector unit 230, a circuit network 240, and at least one testing port 250.

The housing 210 protects components of the diagnostic apparatus 200 and ensures safe operation of the diagnostic apparatus 200. The housing 210 may have any shape and size, and may be formed or include various materials (e.g., metal, plastic, ceramic, etc.). In some embodiments, the housing 210 may entirely or partially enclose, as well as secure, components therein. To this end, the housing 210 may include or have formed therein a variety of features, such as openings, recesses, receptacles, dividers, plates, slots, tabs, supports, and so forth, that may accommodate and control movement of components in the diagnostic apparatus 200. In addition, the housing 210 may include various features or components that may ensure the stability of the diagnostic apparatus 200 (e.g., supports, fasteners, magnets, tripod, etc.).

The input connector unit 220 may include any number and type of inputs that can receive electrical signals from, for instance, the charging station 12 described with reference to FIG. 1. The electrical signals received by the input connector unit 220 may include charging signals, communication signals, and so forth. The output connector unit 230 may also include any number and type of outputs that send electrical signals, for instance, to the EV 10 described with reference to FIG. 1. In some embodiments, the number and type of inputs on the input connector unit 220 matches the number and type of outputs on the output connector unit 230. Non-limiting examples of connectors on the input connector unit 220 and/or output connector unit 230 include combined charging system (CCS) connectors, J-type connectors, Mennekes connectors, GB/T connectors, CHAdeMO connectors, and so forth. The connectors on the input connector unit 220 and output connector unit 230 is not limited, and may include connectors with any configuration and type, including connectors that can support current (e.g., direct current (DC), single-phase alternating current (AC), multi-phase AC, etc.), voltage (e.g., DC voltage, AC voltage, pulsed voltage, etc.), communication (e.g., via control pilot (CP), proximity pilot (PP), etc.), and so forth. In some embodiments, the input connector unit 220 and/or output connector unit 230 may be integrated into the housing 210, or removably coupled to openings in the housing 210, for instance, using fasteners. In some embodiments, the input connector unit 220 and/or output connector unit 230 may include a cable integrated into, and extending from, the input connector unit 220 and/or output connector unit 230.

The circuit network 240 may include a variety of electrical circuitry that electrically connects various components of the diagnostic apparatus. In some embodiments, the circuit network 240 may electrically connect various inputs (e.g., pins, receptacles, terminals, etc.) on the input connector unit 220 with various outputs (e.g., pins, receptacles, terminals, etc.) on the output connector unit 230. For example, the circuit network 240 may include a number of electrical conduits that directly connect inputs to corresponding outputs. In some embodiments, the circuit network 240 may also electrically connect inputs on the input connector unit 220 with a number of testing ports 250. For example, a number of electrical conduits may directly connect inputs to the testing port(s) 250. Electrical conduits in the circuit network 240 may be of any type, including wires, cables, rods, bars, and the like, which may be single-conductor, multi-conductor, insulated, sheathed, armored, braided, co-axial, twisted, bundled, layered, cladded, and so forth.

In addition to electrical conduits, in some embodiments, the circuit network 240 may optionally include a variety of other active and passive components, circuitry, and electronics, such as resistors, transistors, inductors, coils, capacitors, diodes, switches, rectifiers, relays, transformers, integrated circuits (ICs), microcontrollers, logic gates, sensors, potentiometers, panels, boards, buttons, and so forth. In some embodiments, the circuit network 240, or components therein, may be secured to the housing 210 using various features formed into the housing 210, as well as using various adhesives, fasteners, and so forth.

The testing port(s) 250 may provide access to electrical signals flowing through the circuit network 240, and hence, the ability to analyze such electrical signals to diagnose a charging event associated with charging, for instance, an EV 10 as described with reference to FIG. 1. That is, when diagnostic equipment is coupled to at least one of the testing ports 250 of the diagnostic apparatus 200, electrical signals traveling in electrical conduits electrically connected to the testing port(s) 250 can be transmitted to, via respective testing port(s) 250, and accessed by diagnostic equipment. The testing port(s) 250 may include any variety, number, and combination of connectors, sockets, ports, receptacles, and so forth, suitable for receiving diagnostic equipment. In some non-limiting examples, the testing port(s) 250 may include banana connectors, Bayonet Neill-Concelman (BNC) connectors, radio-frequency (RF) connectors, co-axial connectors, and so forth. In some embodiments, the testing port(s) 250 may be integrated into the housing 210, or removably coupled to openings in the housing 210.

As illustrated in FIG. 2, in some embodiments, the diagnostic apparatus 200 may include at least one circuit access 260 that provides access to at least a portion of the circuit network 240. The configuration of the circuit access(es) 260 may depend on the application, and may have any position, shape, and dimension in the diagnostic apparatus 200. In some embodiments, the circuit access(es) 260 may be formed by virtue of shape and dimension of features of the housing 210. In one non-limiting example, a circuit access 260 may be formed by at least one permanent opening or sealable opening in the housing 210. In particular, the sealable opening(s) may be sealed or closed, for example, using any lid, cap, tab, cover, and the like, that may be removably coupled to the sealable opening(s). In another non-limiting example, a circuit access 260 may be formed by a recess in the housing 210.

Figure 3:
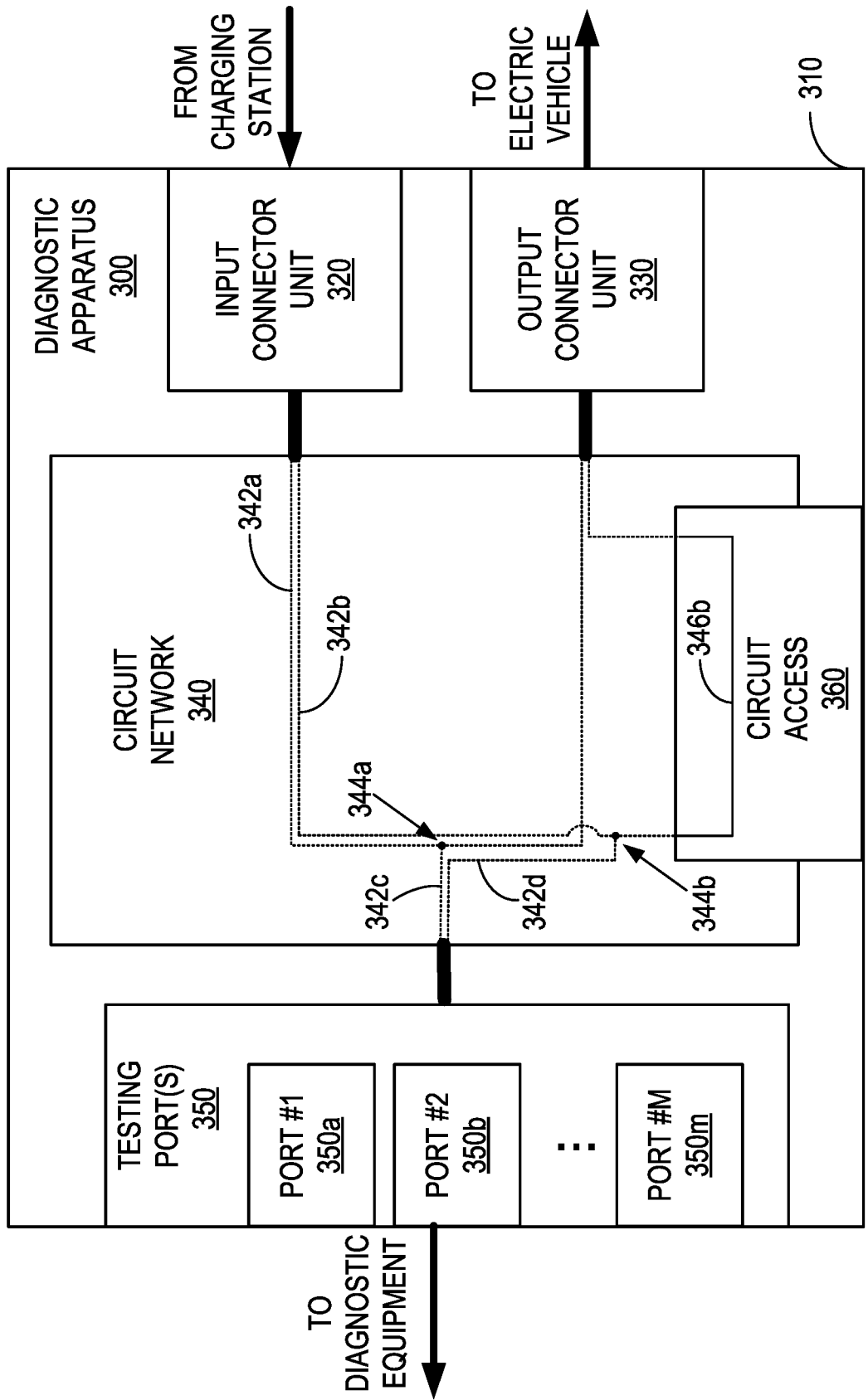
FIG. 3 is a schematic diagram of a diagnostic apparatus, as described herein.

Referring now to FIG. 3, another embodiment of a diagnostic apparatus 300 is illustrated. The diagnostic apparatus 300 may include a housing 310, an input connector unit 320, an output connector unit 330, a circuit network 340, and at least one testing port 350, as described with reference to FIG. 2.

In some embodiments, the circuit network 340 may include a first electrical conduit 342a extending from the input connector unit 320 to the output connector unit 330. The first electrical conduit 342a is electrically connected, at a first end, to an input (e.g. a pin, a receptacle, etc.) on the input connector unit 320 and, at a second end, to a corresponding output (e.g. a pin, a receptacle, etc.) on the output connector unit 320, such that electrical signals from, for example, a charging station 12 as described with reference to FIG. 1, may traverse the first electrical conduit 342a and be transferred to, for example, an EV 10 as described with reference to FIG. 1.

As shown in FIG. 3, in some embodiments, the circuit network 340 may include a second electrical conduit 342b that extends from the input connector unit 320 to the output connector unit 330, and is electrically connected to corresponding input and output connectors of the input connector unit 320 and the output connector unit 330, respectively. In some embodiments, a third electrical conduit 342c may be electrically connected to, at a first end, the first electrical conduit 342a using a first T connection 344a. Thus, electrical signals flowing in the first electrical conduit 342a, between the input connector unit 320 and output connector unit 330, may be accessed and tested through a first testing port 350 that is electrically connected to a second end of the third electrical conduit 342c. Similarly, a fourth electrical conduit 342d may be electrically connected to the second electrical conduit 342b using a second T connection 344b. Electrical signals flowing in the second electrical conduit 342b, between the input connector unit 320 and output connector unit 330, may be accessed and tested through a second testing port 350 that is electrically connected to the fourth electrical conduit 342d. The testing port(s) 350 may include a variety of connectors, as described with reference to FIG. 2.

In some embodiments, electrical signals traversing the second electrical conduit 342b may be additionally, or alternatively, accessible using a circuit access 360 formed in the housing 310. As shown in FIG. 3, the circuit access 360 may expose a portion 346b of the second electrical conduit 342b for access and testing. In some applications, the circuit access 360 may be shaped and dimensioned to allow measurement of the exposed portion 346b using certain diagnostic equipment. For example, the circuit access 360 may be positioned, shaped, and dimensioned to allow inductive measurement of electrical signals traversing the second electrical conduit 342b, for example, using a current clamp. Depending on the nature of the electrical signals in the second electrical conduit 342b, the second electrical conduit 342b or exposed portion 346b of the second electrical conduit 342b may include various safety features, such as insulation (e.g. electrical, thermal, etc.), thermal exchange, and so forth.

Although FIG. 3 shows a specific implementation of the diagnostic apparatus 300, it may be readily appreciated that variations to the diagnostic apparatus 300 may be possible. For instance, the diagnostic apparatus 300 may include fewer or more components. Similarly, although FIG. 3 shows a specific number and configuration of electrical conduits 342, these are shown for illustrative purposes. Indeed, any number of variations, including variation in the number and arrangement of electrical conduits 342, may be possible. For instance, instead of being directly connected using the first T connection 344a, the first electrical conduit 342a and third electrical conduit 342c may be indirectly connected or coupled, for example, via a capacitive coupling, an inductive coupling, and so forth. Further, the circuit network 340 may include a variety of other electrical circuitry, as described with reference to FIG. 2.

Figure 4A:
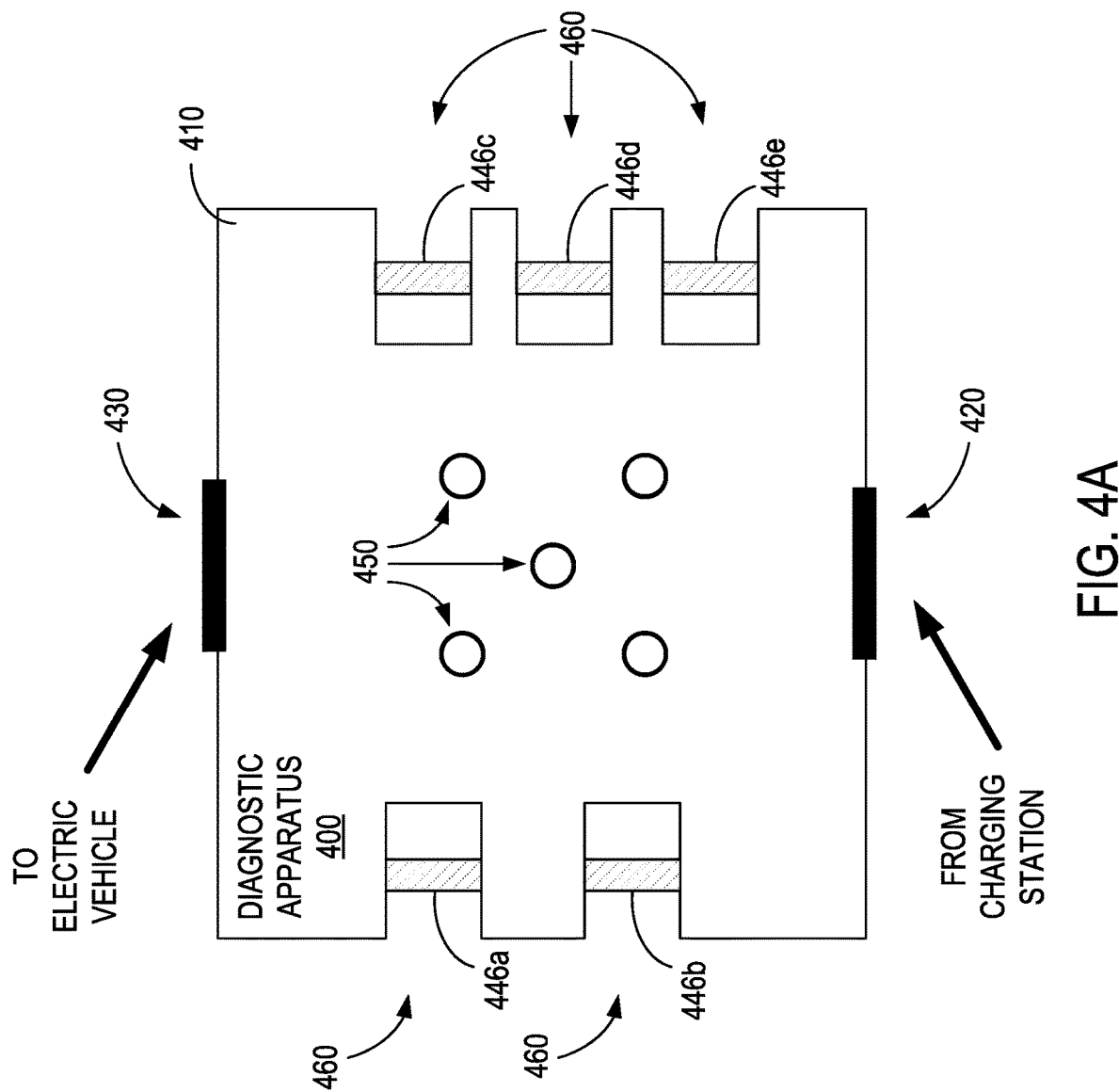
FIG. 4A is an illustration of example diagnostic apparatus, as described herein.
Figure 4B:
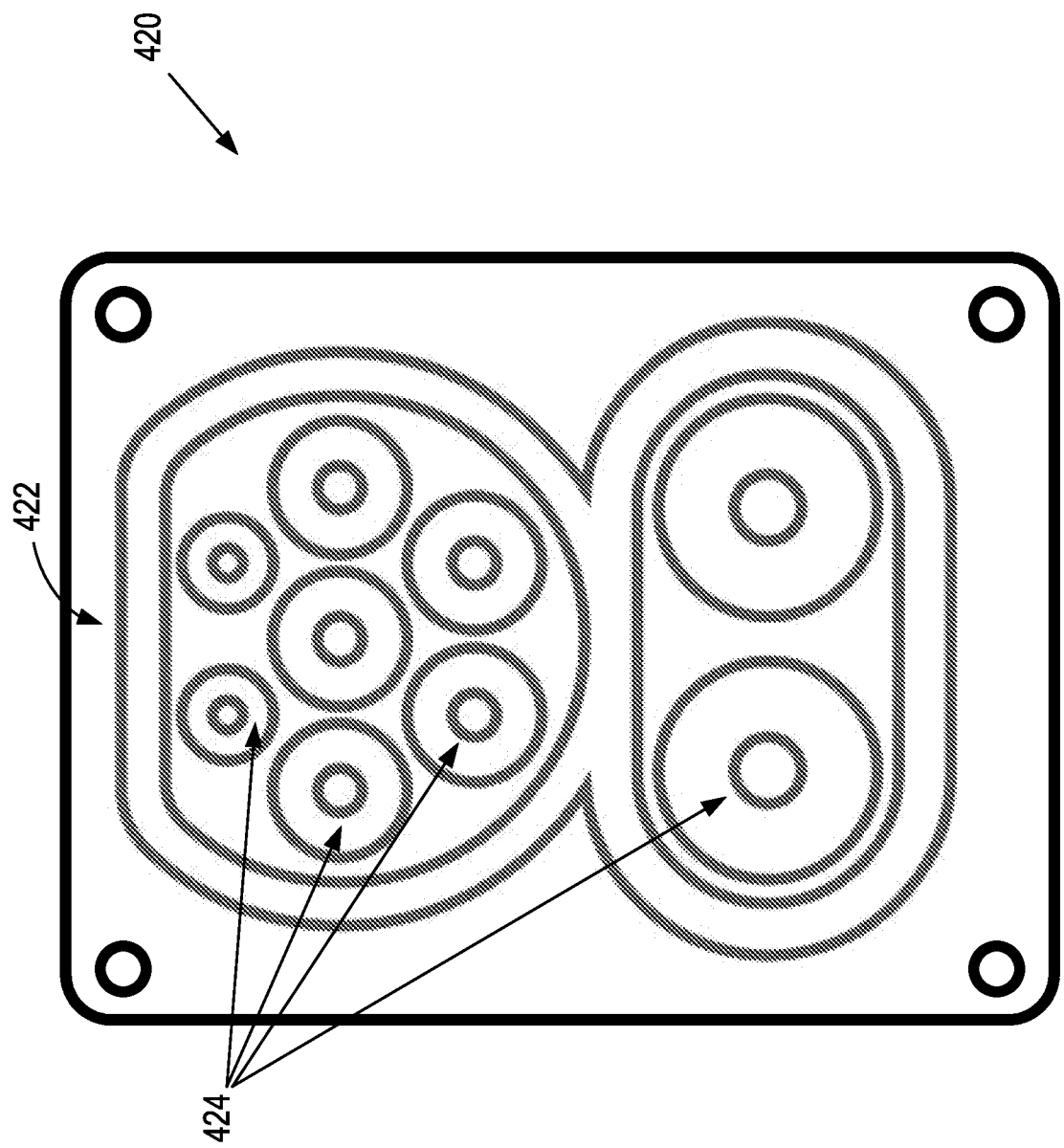
FIG. 4B is an illustration of an example connector, as described herein.
Figure 4D:
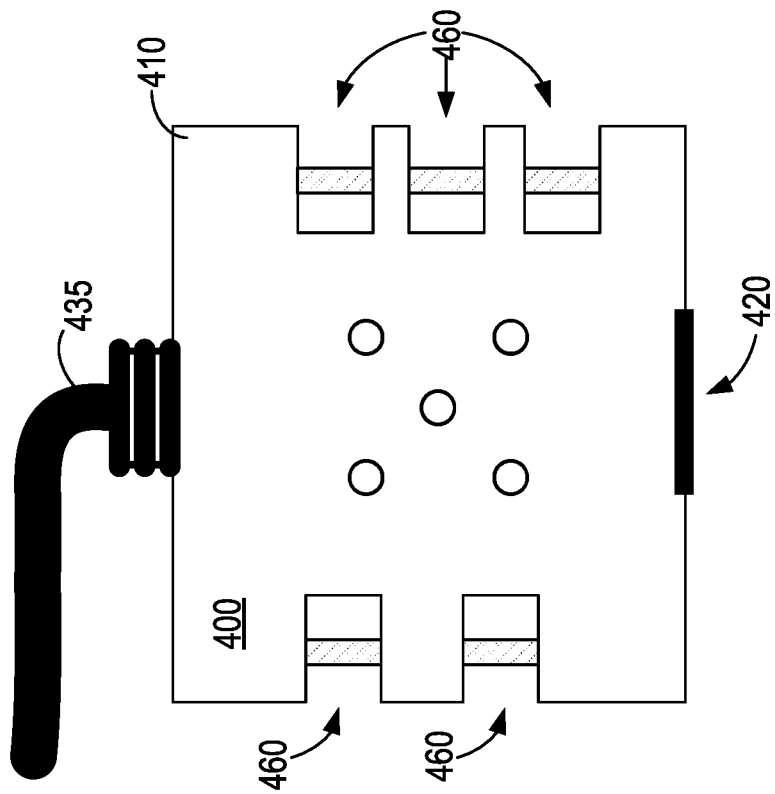
FIG. 4D is an illustration of yet another example diagnostic apparatus, as described herein.

Turning now to FIGS. 4A-4E, yet another embodiment of a diagnostic apparatus 400 is illustrated. Referring specifically to FIG. 4A, the diagnostic apparatus 400 may include a housing 410, an input connector unit 420, an output connector unit 430, a circuit network 440 (not shown), and a number of testing ports 450 and circuit access(es) 460, as described with reference to FIGS. 2 and 3. In some embodiments, the input connector unit 420 may receive a first charging cable that can supply electrical signals from a charge source, such as the charging station 12 described with reference to FIG. 1. For instance, in one non-limiting example, the input connector unit 420 may include a CCS connector 422, as shown in FIG. 4B. In this example, the CCS connector 422 may include a number of inputs 424 that can engage, and electrically connect to, corresponding outputs of a CCS connector on the first charging cable. Similarly, in some embodiments, the output connector unit 430 may receive a second charging cable or adapter that can transmit electrical signals to an electric vehicle, such as the EV 10 described with reference to FIG. 1. For instance, in one non-limiting example, the second charging cable or adapter may also include a CCS connector. In some embodiments, the number and type of outputs on the output connector unit 430 matches the number and type of inputs on the input connector unit 420.

Figure 4C:
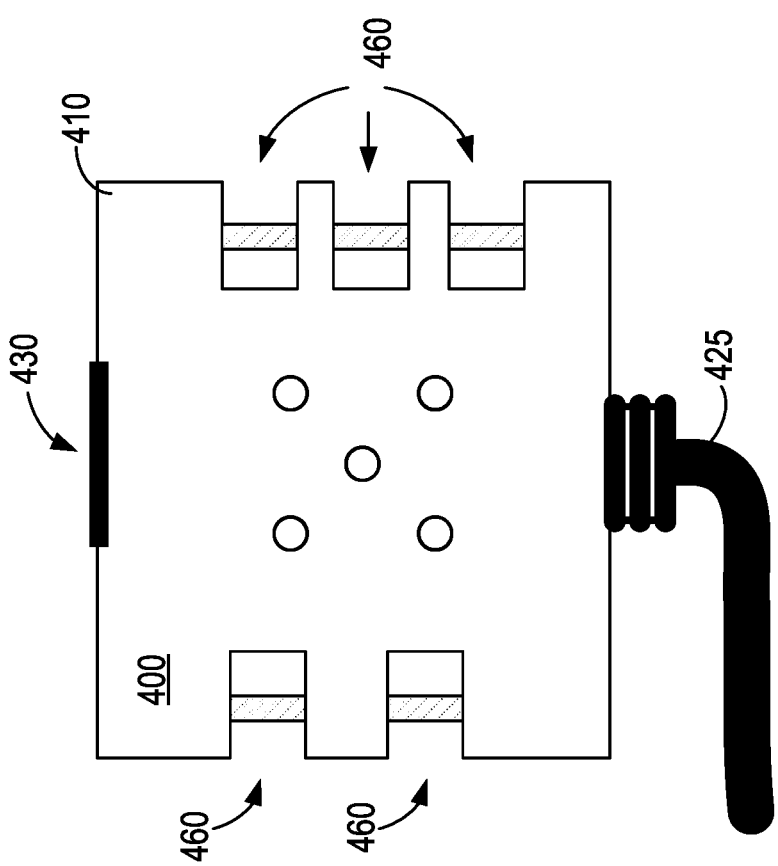
FIG. 4C is an illustration of another example diagnostic apparatus, as described herein.

In one alternative to the configuration of FIG. 4A, shown in FIG. 4C, the input connector unit 420 may include a cable 425 that is integrated with, or attached to, the housing 410 of the diagnostic apparatus 400 at one end of the cable 425. A second end of the cable 425 may connect to a charge source that can supply electrical signals, such as the charging station 12 described with reference to FIG. 1. In yet another alternative, shown in FIG. 4D, the output connector unit 430 may include a cable 435 that is integrated with, or attached to, the housing 410 of the diagnostic apparatus 400 at one end of the cable 435. A second end of the cable 435 may connect to an electric vehicle to receive electrical signals, such as the EV 10 described with reference to FIG. 1.

The circuit network 440 may include a variety of electrical circuitry that electrically connect various components of the diagnostic apparatus 400. In some embodiments, the circuit network 440 may include a number of electrical conduits 442 that directly connect inputs on the input connector unit 420 to corresponding outputs on the output connector unit 420. As described, the electrical conduits in the circuit network 440 may be of any type, including wires, cables, rods, bars, and the like, which may be single-conductor, multi-conductor, insulated, sheathed, armored, braided, co-axial, twisted, bundled, layered, cladded, and so forth.

Referring again to FIG. 4A, the testing ports 450 provide the ability to directly measure electrical signals in the circuit network 440 and diagnose charging of, for instance, an EV 10 as described with reference to FIG. 1. Specifically, diagnostic equipment coupled to at least one of the testing ports 450 can receive electrical signals traveling in electrical conduits 442 that are electrically connected to respective testing port(s) 450. Although FIG. 4A shows a specific number and configuration of testing ports 450 on the diagnostic apparatus 400, the number, location, and type of testing ports 450 may vary. For instance, the testing port(s) 450 may include any variety, number, and combination of connectors, sockets, ports, receptacles, and so forth, suitable for receiving diagnostic equipment. In some non-limiting examples, the testing ports 450 may include banana connectors, Bayonet Neill-Concelman (BNC) connectors, radio-frequency (RF) connectors, co-axial connectors, and so forth.

Figure 4E:
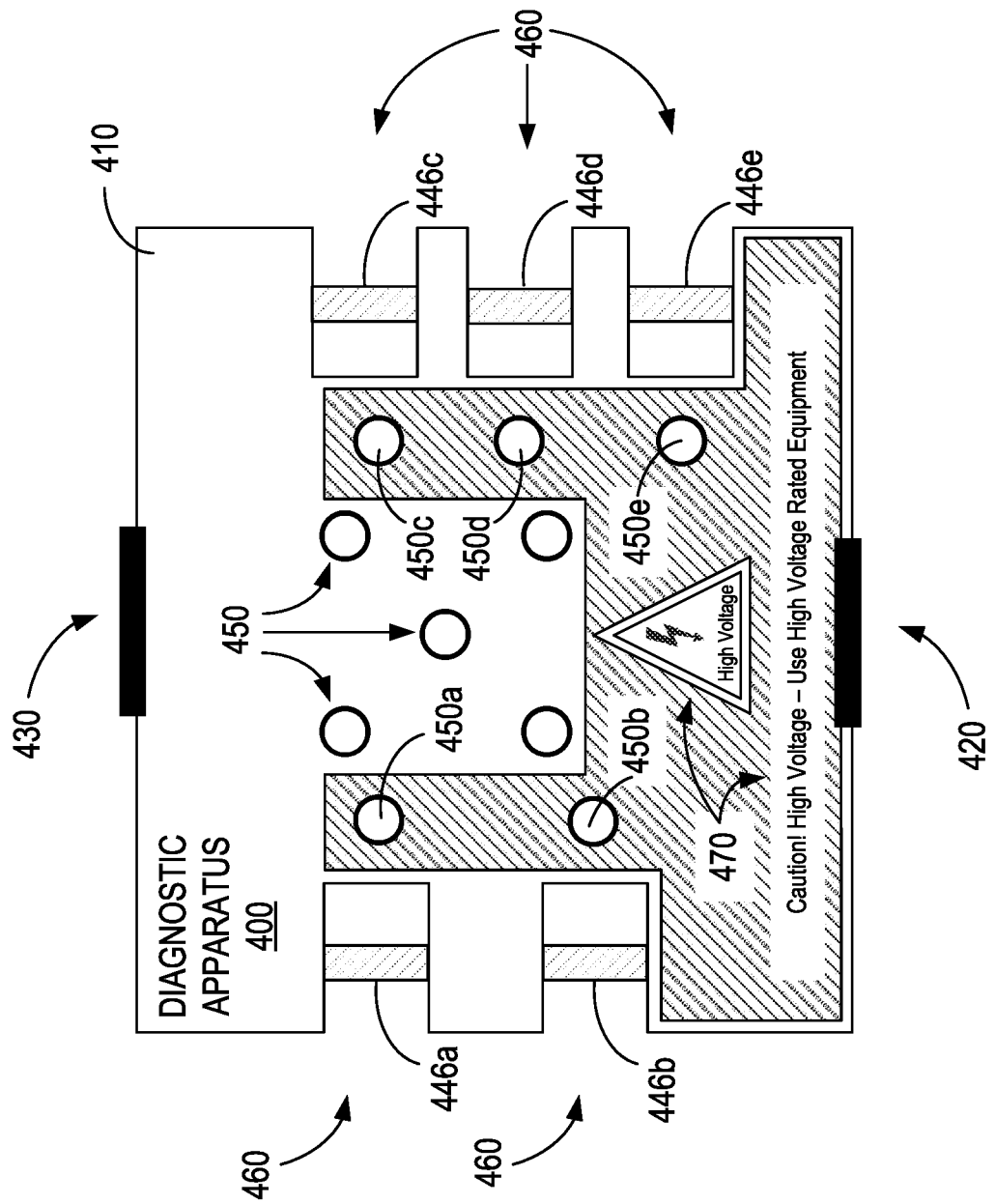
FIG. 4E is an illustration of yet another example diagnostic apparatus, as described herein.

As described, electrical signals in the circuit network 440 may be accessible via various exposed portions 446a, ..., 446e of electrical conduits 442. In some embodiments, electrical signals in the circuit network 440 may be accessed both via testing ports 450 and exposed portions 446a, ..., 446e. For instance, as shown in FIG. 4E, testing ports 450a, ..., 450e may have corresponding exposed portions 446a, ..., 446e. Such configuration allows, for example, direct electrical measurement, as well as inductive measurement. In some embodiments, the diagnostic apparatus 400 may include a number of other features. For instance, as shown in FIG. 4E, the diagnostic apparatus 400 may include labeling 470 that can provide information, warning, or instruction to a user operating the diagnostic apparatus 400.

Figure 5B:
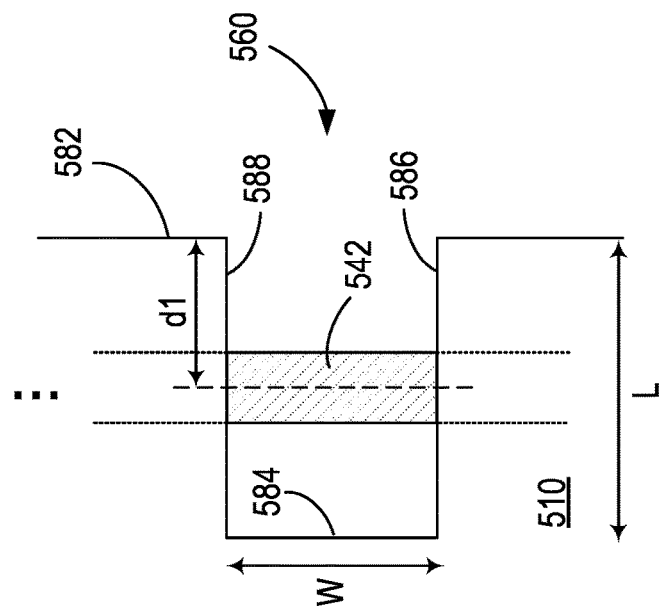
FIG. 5B is a top view of the example in FIG. 5A.
Figure 5A:
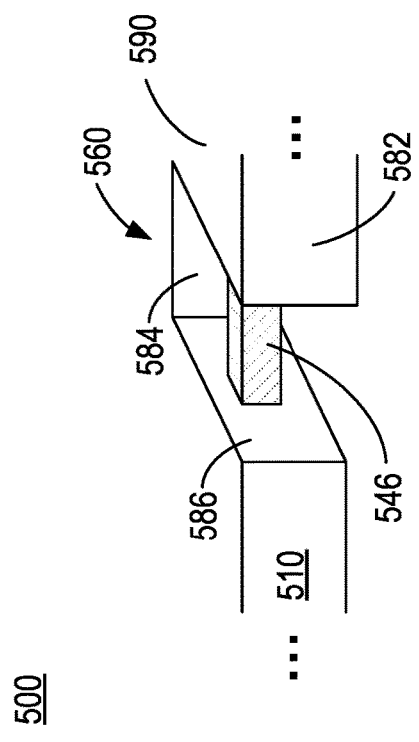
FIG. 5A is a perspective view of an example electrical conduit and circuit access, as described herein.
Figure 5C:
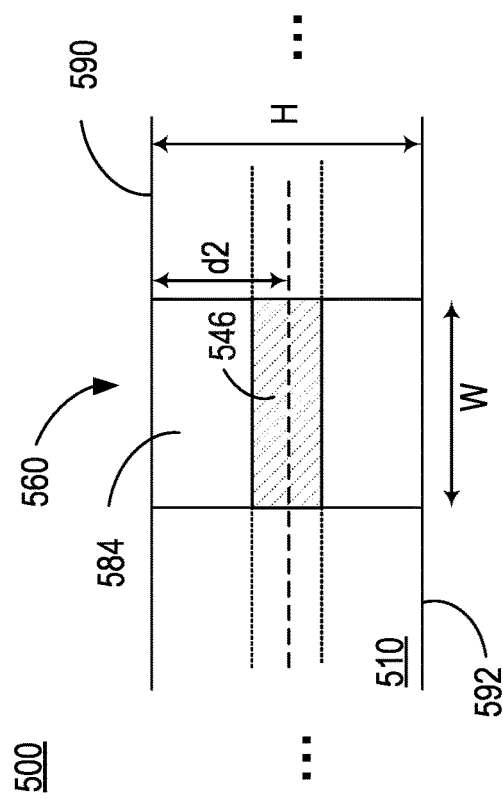
FIG. 5C is a side view of the example in FIG. 5A.

Referring now to FIGS. 5A-5C, one embodiment of a diagnostic apparatus 500 is shown. Referring particularly to the perspective view of FIG. 5A, a circuit access 560 is illustrated, where the circuit access 560 provides access to an exposed portion 546 of a circuit network or electrical conduit, for example, as described with reference to FIG. 3. As shown, the exposed portion 546 may be recessed inside a space of the circuit access 560. The space may be defined by a length L, a width W, and a height H. As shown in FIGS. 5A-5C, the length L of the space may extend between a front surface 582 and rear surface 584, the width W of the space may extend between a left surface 586 and a right surface 588, and the height H of the space may extend from a top surface 590 to a bottom surface 592 of the housing 510. The exposed portion 546 may be recessed inside the space a depth d1 from the front surface 582 (FIG. 5B) and depth d2 from the top surface 590 (FIG. 5C), and protrude from inside the housing 510 through the left surface 586 and right surface 588, respectively. In some embodiments, shape and dimensions of the space and exposed portion 546 are sufficient to accommodate measurement of electrical signals in the exposed portion 546. For example, shape and dimensions of the space and exposed portion 546 are sufficient to receive and accommodate a current clamp, or a measurement component of a current clamp, and allow inductive measurement using such current clamp or component of the current clamp.

Figure 6A:
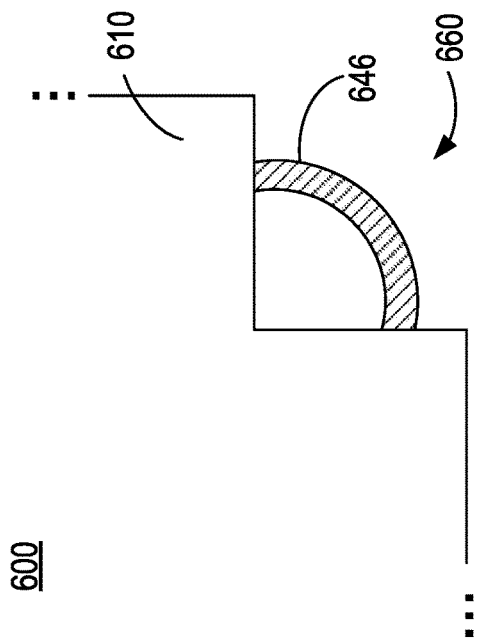
FIG. 6A is a top view of another example electrical conduit and circuit access, as described herein.
Figure 6B:
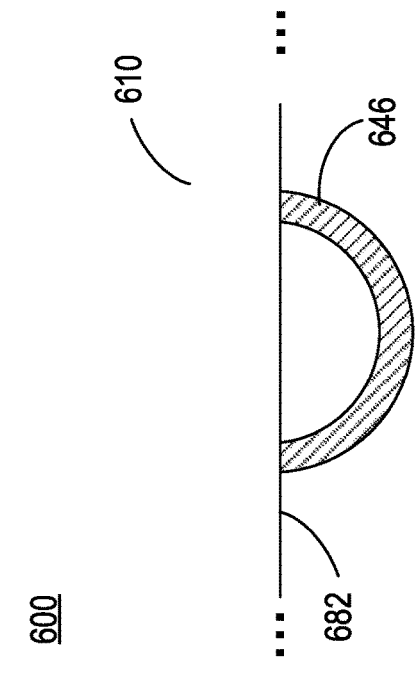
FIG. 6B is a top view of yet another example electrical conduit and circuit access, as described herein.
Figure 6C:
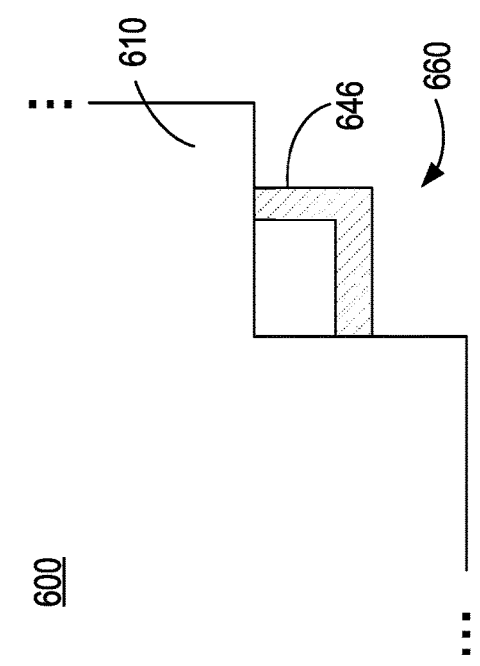
FIG. 6C is a top view of yet another example electrical conduit and circuit access, as described herein.
Figure 6D:
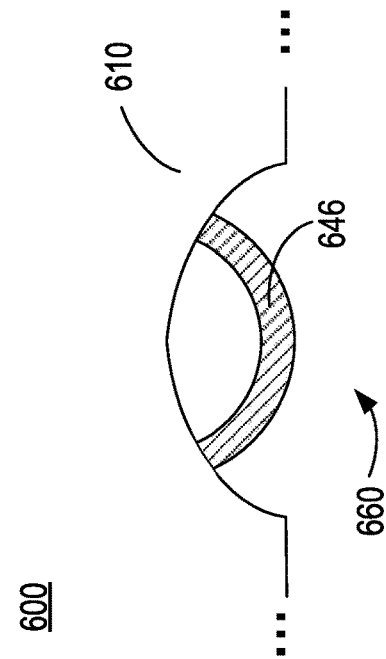
FIG. 6D is a top view of yet another example electrical conduit, as described here.

Although FIGS. 5A-5C show one embodiment of a circuit access 560, circuit access(es) on the diagnostic apparatus 500 may have any position, shape, and dimension. For example, as shown in FIGS. 6A-6B, a circuit access 660 providing access to an exposed portion 646 of a circuit network in a diagnostic apparatus 600 may be positioned at a corner of a housing 610 of the diagnostic apparatus 600. Also, the space of the circuit access 660 need not be cuboidal, but may have any shape. For example, as shown in FIG. 6C, at least one curved surface in the housing 610 may create, for example, a cylindrical space, a spherical space, and so forth. Similarly, the exposed portion 646 may have any shape, such as a ring shape or annular shape, as illustrated in FIGS. 6B-6D. In some embodiments, the exposed portion 646 need not be recessed in a space of the housing 610. For instance, as illustrated in FIG. 6D, the exposed portion 646 may protrude from the same front surface 682 of the housing 610.

According to one embodiment, the diagnostic apparatus includes an input connector unit comprising a plurality of inputs that receive electrical signals from a charging station for electric vehicle charging, and an output connector unit comprising a plurality of outputs that send electrical signals to an electric vehicle. The diagnostic apparatus also includes a circuit network electrically connecting corresponding inputs of the plurality of inputs to outputs of the plurality of outputs, and a housing at least partially enclosing the circuit network. The diagnostic apparatus further includes at least one circuit access that exposes at least a portion of the circuit network. In one embodiment, at least one of the input connector unit and output connector unit is integrated into the housing. In another embodiment, the input connector unit and output connector unit are a combined charging system (CCS) connector. In yet another embodiment, the input connector unit, or the output connector unit, or both, comprise a cable. In yet another embodiment, the diagnostic apparatus further comprises a plurality of testing ports electrically connected to the circuit network, wherein at least one of the plurality of testing ports transmits electrical signals received from the charging station to diagnostic equipment coupled to the at least one of the plurality of testing ports. In yet another embodiment, at least one of the plurality of test ports is integrated into the housing. In yet another embodiment, the at least one circuit access comprises a space formed by at least one surface of the housing. In yet another embodiment, the circuit network comprises at least one electrical conduit, at least a portion of which protrudes through an opening in the housing and extends into the space formed by the at least one surface of the housing. In yet another embodiment, shape and dimensions of the space and at least one portion of the electrical conduit are sufficient to accommodate inductive measurement of electrical signals in the exposed portion.

According to another embodiment, the diagnostic apparatus includes an input connector unit comprising a plurality of inputs that receive electrical signals from a charging station for electric vehicle charging, and an output connector unit comprising a plurality of outputs that send electrical signals to an electric vehicle. The diagnostic apparatus also includes a circuit network electrically connecting corresponding inputs of the plurality of inputs to outputs of the plurality of outputs, at least one testing port electrically connected to the circuit network that transmits electrical signals received from the charging station to diagnostic equipment coupled to the at least one testing port. The diagnostic apparatus further includes a housing at least partially enclosing the circuit network, and at least one circuit access that exposes at least a portion of the circuit network. In another embodiment, the circuit network comprises an electrical conduit extending from the input connector unit to the output connector unit, and another electrical conduit that connects to the electrical conduit at a first end, and to the at least one testing port at a second end. In yet another embodiment, the electrical conduit connects to another electrical conduit using a T connection. In yet another embodiment, the at least one circuit access comprises a space formed by at least one surface of the housing. In yet another embodiment, the circuit network comprises at least one electrical conduit, at least a portion of which protrudes through an opening in the housing and extends into the space formed by the at least one surface of the housing. In yet another embodiment, shape and dimensions of the space and at least one portion of the electrical conduit are sufficient to accommodate inductive measurement of electrical signals in the exposed portion.

What is claimed is:

1. A diagnostic apparatus for electric vehicle charging, the apparatus comprising:
   an input connector unit comprising a plurality of inputs that receive electrical signals from a charging station for electric vehicle charging;
   an output connector unit comprising a plurality of outputs that send electrical signals to an electric vehicle;
   a circuit network electrically connecting corresponding inputs of the plurality of inputs to outputs of the plurality of outputs;
   a housing at least partially enclosing the circuit network; and
   at least one circuit access in the housing that exposes at least a portion of the circuit network.

2. The apparatus of claim 1, wherein at least one of the input connector unit and output connector unit is integrated into the housing.

3. The apparatus of claim 1, wherein the input connector unit and output connector unit are a combined charging system (CCS) connector.

4. The apparatus of claim 1, wherein the input connector unit, or the output connector unit, or both, comprise a cable.

5. The apparatus of claim 1 further comprising a plurality of testing ports electrically connected to the circuit network, wherein at least one of the plurality of testing ports transmits electrical signals received from the charging station to diagnostic equipment coupled to the at least one of the plurality of testing ports.

6. The apparatus of claim 5, wherein at least one of the plurality of test ports is integrated into the housing.

7. The apparatus of claim 1, wherein the at least one circuit access comprises a space formed by at least one surface of the housing.

8. The apparatus of claim 7, wherein the circuit network comprises at least one electrical conduit, at least a portion of which protrudes through an opening in the housing and extends into the space formed by the at least one surface of the housing.

9. The apparatus of claim 8, wherein shape and dimensions of the space and at least one portion of the electrical conduit are sufficient to accommodate inductive measurement of electrical signals in the exposed portion.

10. A diagnostic apparatus for electric vehicle charging, the apparatus comprising:
    an input connector unit comprising a plurality of inputs that receive electrical signals from a charging station for electric vehicle charging;
    an output connector unit comprising a plurality of outputs that send electrical signals to an electric vehicle;
    a circuit network electrically connecting corresponding inputs of the plurality of inputs to outputs of the plurality of outputs;
    at least one testing port electrically connected to the circuit network that transmits electrical signals received from the charging station to diagnostic equipment coupled to the at least one testing port;
    a housing at least partially enclosing the circuit network; and
    at least one circuit access in the housing that exposes at least a portion of the circuit network.

11. The apparatus of claim 10, wherein the circuit network comprises an electrical conduit extending from the input connector unit to the output connector unit, and another electrical conduit that connects to the electrical conduit at a first end, and to the at least one testing port at a second end.

12. The apparatus of claim 11, wherein the electrical conduit connects to another electrical conduit using a T connection.

13. The apparatus of claim 10, wherein the at least one circuit access comprises a space formed by at least one surface of the housing.

14. The apparatus of claim 13, wherein the circuit network comprises at least one electrical conduit, at least a portion of which protrudes through an opening in the housing and extends into the space formed by the at least one surface of the housing.

15. The apparatus of claim 14, wherein shape and dimensions of the space and at least one portion of the electrical conduit are sufficient to accommodate inductive measurement of electrical signals in the exposed portion.

* * * * *